US012626862B2

(12) United States Patent
Iguchi et al.

(10) Patent No.: US 12,626,862 B2
(45) Date of Patent: May 12, 2026

(54) DIELECTRIC COMPOSITION AND ELECTRONIC DEVICE

(71) Applicant: TDK CORPORATION, Tokyo (JP)

(72) Inventors: Toshihiro Iguchi, Tokyo (JP);
Kenichiro Masuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 420 days.

(21) Appl. No.: 18/308,343

(22) Filed: Apr. 27, 2023

(65) Prior Publication Data

US 2023/0386746 A1    Nov. 30, 2023

(30) Foreign Application Priority Data

May 31, 2022    (JP) ................................. 2022-088930

(51) Int. Cl.
  *H01G 4/12*      (2006.01)
  *C04B 35/495*    (2006.01)

(52) U.S. Cl.
  CPC ......... *H01G 4/1236* (2013.01); *C04B 35/495* (2013.01); *C04B 2235/3255* (2013.01); *C04B 2235/3436* (2013.01); *C04B 2235/442* (2013.01); *C04B 2235/5436* (2013.01); *C04B 2235/85* (2013.01)

(58) Field of Classification Search
  CPC .......... H01G 4/1236; C04B 2235/3436; C04B 2235/5436; C04B 2235/85; C04B 2235/785; C04B 2235/3213; C04B 2235/3215; C04B 2235/3244; C04B 2235/786; C04B 2235/80
  See application file for complete search history.

(56) References Cited

U.S. PATENT DOCUMENTS

2015/0274597 A1* 10/2015 Morigasaki ........... C04B 35/638
                                                      428/697
2019/0279817 A1*  9/2019 Park .................... H01G 4/1263
2020/0303122 A1*  9/2020 Iguchi ................. C04B 35/6262

FOREIGN PATENT DOCUMENTS

JP        H03-274607 A    12/1991
JP        2018-020930 A    2/2018

* cited by examiner

*Primary Examiner* — Laura A Auer
(74) *Attorney, Agent, or Firm* — Oliff PLC

(57) ABSTRACT

A dielectric composition includes main phases having a tungsten bronze structure and first segregation phases. The first segregation phases include Ba and Si.

6 Claims, 2 Drawing Sheets

DIELECTRIC COMPOSITION AND ELECTRONIC DEVICE

Figure 1:
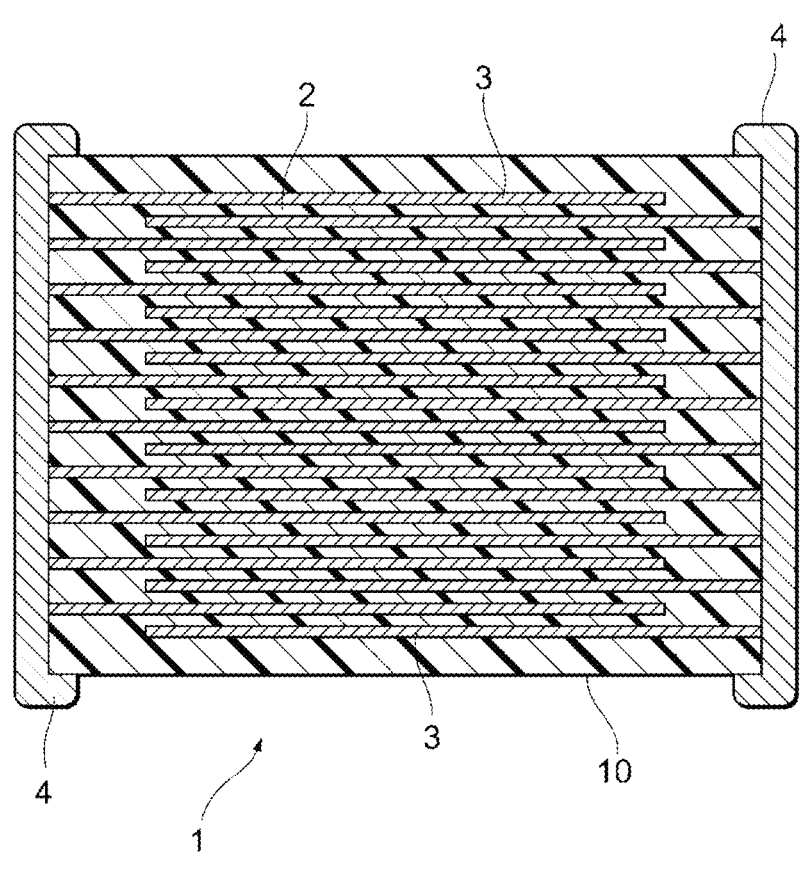

The present application claims a priority based on Japanese Patent Application No. 2022-088930 filed on May 31, 2022 and incorporates it into the present specification by reference to that disclosure in its entirety.

BACKGROUND OF THE INVENTION

The present invention relates to a dielectric composition and an electronic device including dielectric layers composed of the dielectric composition.

Electronic circuits or power supply circuits incorporated in electronic equipment are equipped with a large number of electronic devices such as multilayer ceramic capacitors for utilizing dielectric characteristics of dielectrics. As materials constituting dielectrics of such electronic devices (dielectric materials), barium titanate based dielectric compositions are widely used.

As a dielectric composition other than the barium titanate based dielectric compositions, Japanese Patent Application Laid-Open No. H03-274607 discloses a dielectric composition having a tungsten bronze structure, and dielectric compositions having a tungsten bronze structure and exhibiting a higher relative permittivity are demanded.

BRIEF SUMMARY OF THE INVENTION

The present invention has been achieved under such circumstances. It is an object of the invention to provide a dielectric composition exhibiting a high relative permittivity and an electronic device including dielectric layers composed of the dielectric composition.

To achieve the above object, a dielectric composition according to the present invention comprises:

main phases having a tungsten bronze structure; and
first segregation phases,
wherein the first segregation phases include Ba and Si.

The dielectric composition according to the present invention can exhibit a high relative permittivity.

Moreover, the dielectric composition according to the present invention can exhibit a high resistivity and can also exhibit a high strength.

The first segregation phases may further include Sr.

Preferably, the main phases have an average particle size of 1.5 μm or less.

As a result, the dielectric composition according to the present invention exhibits a higher relative permittivity and a higher resistivity and can exhibit a higher strength.

Preferably, a ratio of an area of the first segregation phases to an area of a predetermined field of view is 0.005 to 0.15.

As a result, the dielectric composition according to the present invention can exhibit a higher relative permittivity. Moreover, when the ratio is within the above-mentioned range, a higher strength can be exhibited compared to when the ratio is below the above-mentioned range.

Preferably, a molar ratio of a total of Ba element and Sr element to Si element in the first segregation phases is 1.05 to 2.5.

As a result, the dielectric composition according to the present invention can exhibit a higher relative permittivity. Moreover, when the molar ratio is within the above-mentioned range, a higher strength can be exhibited compared to when the molar ratio is below the above-mentioned range.

Preferably, the first segregation phases surrounded by three or more of the main phases are specific first segregation phases, and a ratio of an average particle size of the specific segregation phases to an average particle size of the main phases is 1 or less.

As a result, the dielectric composition according to the present invention can exhibit a higher relative permittivity.

A composition of the main phases may be represented by a formula of $A_a B_b D_4 O_{15+\alpha}$, in which A includes at least Ba,
B includes at least Zr,
D includes at least Nb,
a is 3.05 or more, and
b is 1.01 or more.

As a result, the dielectric composition according to the present invention can exhibit a higher resistivity.

An electronic device according to the present invention comprises dielectric layers composed of the above-mentioned dielectric composition.

BRIEF DESCRIPTION OF THE DRAWING(S)

Figure 2:
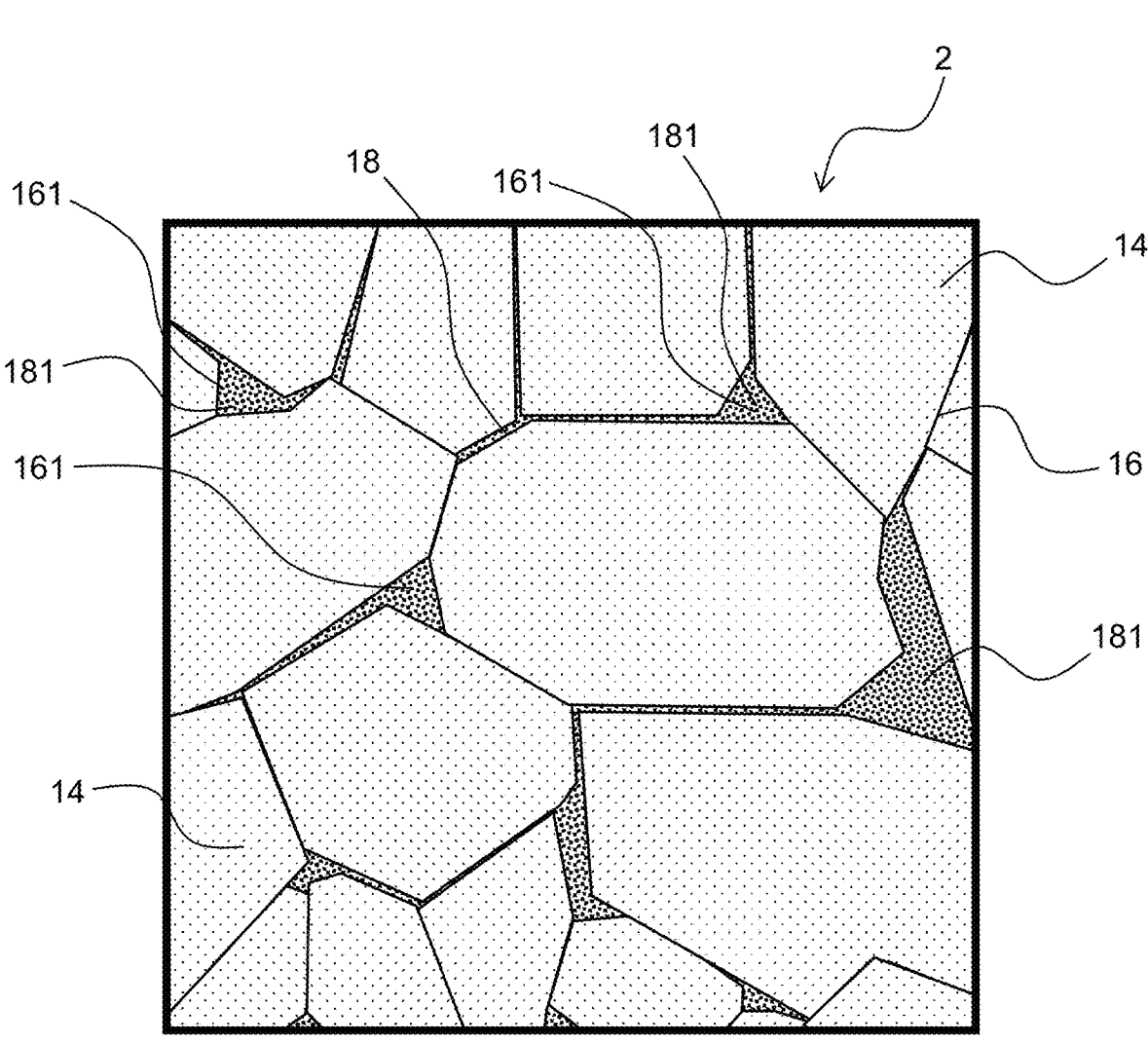

FIG. 1 is a schematic cross-sectional view of a multilayer ceramic capacitor according to an embodiment of the present invention; and FIG. 2 is a schematic cross-sectional view of a dielectric composition constituting dielectric layers shown in FIG. 1.

DETAILED DESCRIPTION OF THE INVENTION

Hereinafter, the present invention is described based on a specific embodiment.

Multilayer Ceramic Capacitor

FIG. 1 shows a multilayer ceramic capacitor 1 as an example of an electronic device according to the present embodiment. The multilayer ceramic capacitor 1 includes an element body 10 consisting of dielectric layers 2 and internal electrode layers 3 alternately laminated. A pair of external electrodes 4 electrically connected to the internal electrode layers 3 alternately arranged inside the element body 10 is formed at both ends of the element body 10. The shape of the element body 10 is not limited, but is normally rectangular parallelepiped. The dimensions of the element body 10 are not limited either and are determined appropriately according to the application.

The dielectric layers 2 are composed of a dielectric composition according to the present embodiment described below. As a result, the multilayer ceramic capacitor 1 including the dielectric layers 2 can exhibit a high resistivity (e.g., $1.0 \times 10^6 \, \Omega m$ or more) even if the main component of the internal electrode layers 3 is a base metal.

The thickness per layer (interlayer thickness) of the dielectric layers 2 is not limited and can be freely determined according to desired characteristics, applications, and the like. Normally, the interlayer thickness is preferably 100 μm or less and is more preferably 30 μm or less. The lamination number of dielectric layers 2 is not limited, but is preferably, for example, 20 or more in the present embodiment.

In the present embodiment, the internal electrode layers 3 are laminated so that their end surfaces are alternately exposed to the surfaces of two opposite ends of the element body 10.

The main component of the conductive material contained in the internal electrode layers 3 is a base metal. The base metal is not limited and is a known conductive material as a base metal, such as Ni, Ni based alloy, Cu, and Cu based alloy. Ni, Ni based alloy, Cu, or Cu based alloy may contain various fine components, such as P, in an amount of about 0.1 mass % or less. The internal electrode layers 3 may be formed using a commercially available electrode paste. The thickness of the internal electrode layers 3 is appropriately determined depending on the application.

The conductive material contained in the external electrodes 4 is not limited and is a known conductive material, such as Ni, Cu, Sn, Ag, Pd, Pt, Au, their alloy, and conductive resin. The thickness of the external electrodes 4 is appropriately determined depending on the application.

As shown in FIG. 2, the dielectric composition according to the present embodiment includes main phases 14 and grain boundaries 16 existing between the main phases 14. The grain boundaries 16 contain components or the like diffused from first segregation phases 18 or the main phases 14. In the present embodiment, the main phases 14 are main phases 14 after sintering.

The main phases 14 are composed of a composite oxide having a tungsten bronze structure. In the present embodiment, the composite oxide is contained in 80 mass % or more, preferably 90 mass % or more, in 100 mass % of the dielectric composition.

The average particle size of the main phases 14 is preferably 1.5 μm or less and is more preferably within the range of 0.3 to 1.0 nm. In the present embodiment, the particle sizes of the main phases 14 and the particle sizes of the first segregation phases 18 described below can be measured as, for example, circle area equivalent diameters. The circle area equivalent diameter signifies a diameter of a circle having the same area as this shape.

Preferably, the particle sizes of the main phases 14 have a D90 of 3 μm or less. Here, a D90 is a particle size of a particle with a cumulative frequency of 90% counting from the smaller particle sizes.

Elements other than oxygen contained in a composite oxide having a tungsten bronze structure are divided into three element groups ("A", "B", and "D") based on valence, and the composite oxide is represented by a formula of $A_aB_bD_4O_{15+}\alpha$.

"A" is a divalent element and includes Ba. "B" is a tetravalent element and includes Zr. "D" is a pentavalent element and includes Nb. In addition, "a" in the above-mentioned formula indicates an atomic number ratio of "A" when the element constituting "D" contains four atoms in the formula, and "b" in the above-mentioned formula indicates an atomic number ratio of "B" when the element constituting "D" contains four atoms in the formula.

In the present embodiment, "a" is 3.05 or more and is preferably 3.10 or more. The upper limit of "a" is, for example, preferably 3.50 or less and is more preferably 3.30 or less.

In the present embodiment, "b" is 1.01 or more and is preferably 1.05 or more. The upper limit of "b" is, for example, preferably 1.50 or less and is more preferably 1.30 or less.

Thus, the above-mentioned composite oxide can be said to be a composite oxide whose stoichiometric composition is represented by a formula of $A_3B_1D_4O_{15}$, in which "A" and "B" are excessively contained in a predetermined proportion with respect to "D". Since "A" and "B" are excessively contained with respect to "D" compared to the proportion of "A", "B", and "D" in the formula (A:B:D=3:1:4), the above-mentioned composite oxide can exhibit a high resistivity even if fired in a reducing atmosphere. As a result, an electronic device obtained by simultaneously firing a dielectric composition including the above-mentioned composite oxide as a main component together with an electrode composed of a base metal can sufficiently exhibit dielectric characteristics premised on being an insulator.

In the composite oxide, the amount of oxygen (O) may change depending on the composition proportion of "A", "B", and "D", oxygen defects, and the like. Thus, in the present embodiment, a stoichiometric ratio in the composite oxide represented by the formula of $A_3B_1D_4O_{15}$ is used as a reference, and a deviation amount of oxygen from the stoichiometric ratio is represented by "a". The range of "a" is not limited and is, for example, about −1 or more and 1 or less.

In the present embodiment, "A" includes at least Ba, but may include a divalent element 1A in addition to Ba. Preferably, "1A" includes one or more selected from the group consisting of Mg, Ca, and Sr. When "A" includes "1A" in addition to Ba, the composite oxide according to the present embodiment can be represented as $(Ba_{1-x}1A_x)_a B_bD_4O_{15+}\alpha$. In this formula, "x" is preferably 0.00 or more. On the other hand, "x" is preferably 0.50 or less and is more preferably 0.25 or less. Even if "A" includes "1A", favorable dielectric characteristics are obtained.

From the viewpoint of obtaining a high relative permittivity, when the total number of atoms constituting "A" is 1, the ratio of the number of Mg atoms is preferably 0.20 or less and is more preferably 0.10 or less.

"B" includes at least Zr, but may include a tetravalent element 1B in addition to Zr. Preferably, "1B" includes one or more selected from the group consisting of Ti and Hf. When "B" includes "1B" in addition to Zr, the composite oxide according to the present embodiment can be represented as $A_a(Zr_{1-y}1B_y)_bD_4O_{15+}\alpha$. In this formula, "y" is preferably 0.00 or more. On the other hand, "y" is preferably 0.50 or less and is more preferably 0.25 or less. Even if "B" includes "1B", favorable dielectric characteristics are obtained.

In the present embodiment, from the viewpoint of obtaining a high resistivity, when the total number of atoms constituting "B" is 1, the ratio of the number of Ti atoms is preferably 0.25 or less, more preferably 0.125 or less, and still more preferably substantially free of Ti. Here, "substantially free of Ti" means that Ti may be contained as long as its amount is due to unavoidable impurities.

"D" includes at least Nb, but may include a pentavalent element 1D in addition to Nb. Preferably, "1D" includes Ta. When "D" includes "1D" in addition to Nb, the composite oxide according to the present embodiment can be represented as $A_aB_b(Nb_{1-z}1D_z)_4O_{15+}\alpha$. In this formula, "z" is preferably 0.00 or more. On the other hand, "z" is preferably 0.50 or less and is more preferably 0.25 or less. Even if "D" includes "1D", favorable dielectric characteristics are obtained.

When the total number of atoms constituting "A" is 1, the ratio of the number of atoms of the divalent element 1A other than Mg, Ca, and Sr is preferably 0.10 or less. When the total number of atoms constituting "B" is 1, the ratio of the number of atoms of the tetravalent element 1B other than Ti and Hf is preferably 0.10 or less. When the total number of atoms constituting "D" is 1, the ratio of the number of atoms of the pentavalent element 1D other than Ta is preferably 0.10 or less.

Accordingly, the formula of $A_aB_bD_4O_{15+}\alpha$ can be represented by $(Ba_{1-x}1A_x)_a(Zr_{1-y}1B_y)_b(Nb_{1-z}1D_z)_4O_{15+}\alpha$. "a", "b", "x", "y", "z", and "α" are in the above-mentioned ranges.

As described above, in the dielectric composition according to the present embodiment, the first segregation phases 18 are contained in the grain boundaries 16 existing between the main phases 14. The first segregation phases 18 are particularly likely to be confirmed in grain boundary triple points 161 formed by three or more of the main phases 14, but are also present between two adjacent main phases 14. In the present embodiment, the first segregation phases 18 surrounded by three or more of the main phases 14 are defined as specific first segregation phases 181.

In the present embodiment, the "grain boundary triple points 161" are the grain boundaries 16 made of three or more main phases 14 and may thus be made of four or more of the main phases 14.

In the present embodiment, a ratio of an area of the first segregation phases 18 to an area of a predetermined field of view (an area of the first segregation phases 18/an area of a predetermined field of view) is preferably 0.005 to 0.15 and is more preferably 0.006 to 0.13.

Preferably, a total molar ratio {(Ba+Sr)/Si} of a total of Ba element and Sr element to Si element in the first segregation phases 18 is 1.05 to 2.5.

In the present embodiment, preferably, a ratio of an average particle size of the specific first segregation phases 181 to an average particle size of the main phases 14 (an average particle size of the specific first segregation phases 181/an average particle size of the main phases 14) is 1 or less.

In addition to the elements constituting the above-mentioned composite oxide or Ba, Sr, and Si, the dielectric composition according to the present embodiment may include other components, such as Al, V, rare earth elements, alkali metals, and Mn. The amount of other components is preferably 20 mass % or less, more preferably 10 mass % or less, in 100 mass % of the dielectric composition. In particular, from the viewpoint of improving the resistivity, the $Fe_2O_3$ content is preferably 0.1 mass % or less in 100 mass % of the dielectric composition.

The method of observing the structure of the dielectric composition is not limited. For example, a cross section of the dielectric composition can be observed with a reflected electron image of a scanning electron microscope (SEM) or a HAADF image of a scanning transmitted electron microscope (STEM). In this case, the main phases 14 are often recognized as bright parts of contrast. This is because the main phases 14 are often denser than components diffused from the first segregation phases 18 or the main phases 14 constituting the grain boundaries 16. Thus, the grain boundaries 16 and the first segregation phases 18, which are often less dense than the main phases 14, or components diffused from the main phases 14 are often recognized as dark parts of contrast. The area of field of view to be photographed, namely, "predetermined field of view" is not limited and is, for example, a square of about 1 to 50 μm.

In the present embodiment, there is no limit to the method of determining whether a dielectric composition constituting the dielectric layers 2 includes the first segregation phases 18, and, for example, parts where Ba and Si exist at the same position can be determined as the first segregation phases 18 by comparing a mapping image of Ba and a mapping image of Si.

Method of Manufacturing Multilayer Ceramic Capacitor

Next, an example of a method of manufacturing a multilayer ceramic capacitor 1 shown in FIG. 1 is described below.

The multilayer ceramic capacitor 1 according to the present embodiment can be manufactured by substantially the same method as conventional multilayer ceramic capacitors. Specifically, for example, there is a method of manufacturing green chips using a paste containing raw materials of a dielectric composition and firing them so as to manufacture a multilayer ceramic capacitor. Hereinafter, a manufacturing method is specifically described.

First, a starting raw material for a dielectric composition is prepared. As the starting raw material, a composite oxide constituting the main phases 14 of the above-mentioned dielectric composition can be employed. Moreover, it is possible to employ an oxide of each metal contained in the composite oxide. Moreover, it is possible to employ various compounds to be components constituting the composite oxide by firing. Examples of the various compounds include carbonate, oxalate, nitrate, hydroxide, and metal organic compound.

As a starting raw material for the first segregation phases 18, an oxide containing Ba and Si or an oxide containing Ba, Sr, and Si are prepared. As the starting raw material for the first segregation phases 18, specifically, $BaSiO_3$ and/or $Ba_{0.5}Sr_{0.5}O_3$, etc. are/is prepared. In the present embodiment, preferably, the starting raw materials for the main phases 14 and the first segregation phases 18 are powder.

Among the prepared starting raw materials, the raw material for the main phases 14 are weighed at a predetermined ratio and thereafter mixed in a wet manner for a predetermined time using a ball mill and the like. After drying this mixed powder, a heat treatment is performed in the atmosphere at a temperature of 700 to 1300° C. to obtain a calcined powder of the composite oxide constituting the main phases 14.

Next, a paste for producing green chips is prepared. The obtained calcined powder of the composite oxide constituting the main phases 14, the starting raw material of the first segregation phases 18, a binder, and a solvent are kneaded and turned into a paint to prepare a dielectric layer paste. The binder and the solvent are known ones. If necessary, the dielectric layer paste may also contain additives, such as plasticizers and dispersants.

An internal electrode layer paste is obtained by kneading a raw material of the above-mentioned conductive material, a binder, and a solvent. The binder and the solvent are known ones. If necessary, the internal electrode layer paste may contain additives, such as inhibitors and plasticizers.

An external electrode layer paste can be prepared similarly to the internal electrode layer paste.

Green sheets and an internal electrode pattern are formed using the obtained pastes, and these are laminated to obtain a green chip.

If necessary, the obtained green chip is subjected to a binder removal treatment. Conditions for the binder removal treatment are known ones. For example, the holding temperature is preferably 200 to 350° C.

After the binder removal treatment, the green chip is fired to obtain an element body. In the present embodiment, a firing (reduction firing) can be performed in a reducing atmosphere. Other conditions for the firing are known ones. For example, the holding temperature is preferably 1200 to 1450° C.

After the firing, if necessary, the obtained element body is subjected to a reoxidation treatment (annealing). Conditions for the annealing are known ones. For example, preferably, the oxygen partial pressure during the annealing is higher than the oxygen partial pressure during the firing, and the holding temperature is 1150° C. or less.

The dielectric composition constituting the dielectric layers 2 of the element body 10 obtained as described above is the above-mentioned dielectric composition. The end surfaces of the element body 10 are polished, and the external electrode paste is applied thereto and baked to form the external electrodes 4. Then, if necessary, a coating layer is formed on the surfaces of the external electrodes 4 by plating or the like.

Accordingly, the multilayer ceramic capacitor 1 according to the present embodiment is manufactured.

The dielectric composition according to the present embodiment can exhibit a high relative permittivity. In the main phases 14 having a tungsten bronze structure according to the present embodiment, it is found that when the main phases 14 have an average particle size of about 1.5 μm or less, the relative permittivity tends to improve as the average particle size of the main phases 14 increases, but when the main phases 14 have an average particle size of more than about 1.5 μm, the relative permittivity tends to decrease as the average particle size of the main phases 14 increases.

It is also found that when the dielectric composition according to the present embodiment includes the first segregation phases 18, the main phases 14 have a small average particle size. This is probably because, in the dielectric composition according to the present embodiment, the pinning effect of the first segregation phases 18 functions effectively. The pinning effect is a phenomenon in which the grain growth of first phase particles is prevented by second phase particles. That is, in the present embodiment, it is considered that the movement of the grain boundaries 16 of the main phases 14 (first phase particles) is prevented by the pinning effect of the first segregation phases 18 (second phase particles), and the grain growth of the main phases 14 (first phase particles) is consequently prevented.

Accordingly, in the dielectric composition according to the present embodiment, it is considered that since the grain growth of the main phases 14 during firing can be prevented by the first segregation phases 18, the particle sizes of the main phases 14 can be adjusted in a desired range, and a high relative permittivity can consequently be exhibited. Moreover, in the present embodiment, a high resistivity can be exhibited, and a high strength can also be exhibited.

The reason why the dielectric composition according to the present embodiment can exhibit a high strength is considered that even if cracking is generated in the dielectric composition, the first segregation phases 18 can prevent cracking from progressing.

The above-mentioned embodiment describes a case where the electronic device according to the present invention is a multilayer ceramic capacitor, but the electronic device according to the present invention is not limited to a multilayer ceramic capacitor and may be any electronic device including the above-mentioned dielectric composition.

Hereinabove, an embodiment of the present invention is described, but the present invention is not limited to the above-mentioned embodiment and may be modified in various modes within the scope of the present invention.

EXAMPLES

Hereinafter, the present invention is described in more detail with Examples and Comparative Examples. However, the present invention is not limited to Examples below.

Experiment 1

Powders of barium carbonate ($BaCO_3$), strontium carbonate ($SrCO_3$), zirconium oxide ($ZrO_2$), and niobium oxide ($Nb_2O_5$) were prepared as starting raw materials for main phases 14 of a dielectric composition. The prepared starting raw materials were weighed so that the dielectric composition after firing would have the composition shown in Table 1.

Next, each of the weighed powders was mixed in a wet manner by a ball mill for 16 hours using an ion-exchanged water as a dispersion medium, and this mixture was dried to obtain a mixed raw material powder. After that, the obtained mixed raw material powder was subjected to a heat treatment in the atmosphere at a holding temperature of 900° C. for a holding time of 2 hours to obtain a calcined powder of a composite oxide constituting the main phases 14.

An additive shown in Table 1 was weighed so as to have 2 parts by mass with respect to 100 parts by mass of the composite oxide constituting the main phases 14.

The obtained calcined powder of the composite oxide and the additive were pulverized in a wet manner by a ball mill for 16 hours using an ion-exchanged water as a dispersion medium, and this pulverized product was dried to obtain a dry powder.

100 mass % of the dry powder was added with 10 mass % of an aqueous solution containing 6 mass % of a polyvinyl alcohol resin as a binder and granulated to obtain a granulated powder.

The obtained granulated powder was put into a die of φ12 mm, subjected to a temporary press molding at a pressure of 0.6 ton/cm², and further subjected to a main press molding at a pressure of 1.2 ton/cm² to obtain a disk-shaped green compact.

The obtained green compact was fired in a reducing atmosphere and further subjected to an annealing treatment to obtain a "sintered body fired in a reducing atmosphere and subjected to an annealing treatment". As conditions for the firing, the heating rate was 200° C./h, the holding temperature was 1375° C., and the holding time was 2 hours. The atmospheric gas was a mixed gas of nitrogen and hydrogen (hydrogen concentration: 3%) humidified to a dew point of 20° C. As conditions for the annealing treatment, the holding temperature was 1050° C., and the holding time was 2 hours. The atmospheric gas was a nitrogen gas humidified to a dew point of 20° C. Moreover, for the purpose of only measuring the relative permittivity, the obtained green compact was fired in the air to obtain a "sintered body fired in the air". As conditions for the firing, the heating rate was 200° C./h, the holding temperature was 1375° C., and the holding time was 2 hours. The "sintered body fired in the air" was not subjected to an annealing treatment.

Both main surfaces of the obtained sintered body were coated with an In—Ga alloy to form a pair of electrodes. Then, a disk-shaped ceramic capacitor sample was obtained.

(Determination of Main Phases)

The main phases 14 were determined as follows. A sample was manufactured by thinning the "sintered body fired in a reducing atmosphere and subjected to an annealing treatment" with a focused ion beam processing apparatus (FIB). The thinned sample was observed with a HAADF image of a STEM, and the main phases 14 were determined. The observation field of view at this time was 2 μm×2 μm. Likewise, the main phases 14 were also determined in other two observation fields of view, and the main phases 14 were determined in three observation fields of view in total.

(Determination of First Segregation Phases)

A mapping image of Ba and a mapping image of Si were obtained by energy dispersive X-ray spectroscopy (EDS) in the above-mentioned observation field of view. Parts where Ba and Si were present at the same position were determined as the first segregation phases 18. Likewise, the first segregation phases 18 were also determined in other two observation fields of view, and the first segregation phases 18 were determined in three observation fields of view in total.

(Area of First Segregation Phases/Area of Predetermined Field of View)

In the above-mentioned three observation fields of view, a ratio of a total area of the first segregation phases 18 in each observation field of view to an area of each observation field of view was calculated, and their average value was determined as "an area of first segregation phases/an area of a predetermined field". Table 1 shows the results.

(Average Particle Size of Main Phases)

An average value of particle sizes (circle area equivalent diameters) of the main phases 14 in the above-mentioned three observation fields of view was determined as an "average particle size of main phases". Table 1 shows the results. The average particle size was obtained from the main phases 14 whose entire outer circumferences were included in the observation fields of view. That is, areas of the main phases 14 even partially protruding from the observation fields of view were not calculated and were not included for the calculation of the average particle size of the main phases.

(Resistivity)

For a capacitor sample of the "sintered body fired in a reducing atmosphere and subjected to an annealing treatment", a resistance was measured using a tester (CDM-2000D manufactured by Custom Co., Ltd.) at a reference temperature (25° C.). When the resistance was high and could not be measured with the tester, the resistance was measured by applying 100V for 1 minute using a digital resistance meter (R8340 manufactured by ADVANTEST). A resistivity was calculated from the obtained resistance, the effective electrode area, and the thickness of the dielectric layers. The resistivity is preferably higher. Table 1 shows the results.

(Relative Permittivity)

For a capacitor sample of the "sintered body fired in the air", a signal with a frequency of 1 kHz and an input signal level (measurement voltage) of 1 Vrms was applied at a room temperature (20° C.) with a digital LCR meter (4284A manufactured by YHP) to measure a capacitance and a tan S. Then, a relative permittivity (no unit) was calculated based on the thickness of the dielectric layers, the effective electrode area, and the capacitance obtained by the measurement. The relative permittivity is preferably higher. Table 1 shows the results.

(Breakage Probability during Polishing)

First, a metal plate heated by a hot plate was prepared. A paraffin wax was applied to this metal plate, and the "sintered body fired in a reducing atmosphere and subjected to an annealing treatment" was placed thereon and cooled to the room temperature so as to fix the sintered body to the metal plate. While the sintered body was fixed, the metal plate was moved, and a free surface of the sintered body opposite to the surface in contact with the metal plate was entirely polished with a waterproof abrasive paper of #800 and removed. After that, the metal plate to which the sintered body was fixed was immersed into acetone so as to remove the paraffin wax. Among the polished sintered bodies, the number of sintered bodies having cracking was counted by observing the sintered bodies with a stereoscopic microscope. A breakage probability during polishing was calculated by dividing the number of sintered bodies having cracking by the number of polished sintered bodies. It can be determined that the lower the breakage probability during polishing was, the higher the strength was.

Experiment 2

Experiment 2 relates to samples in Table 2.

In Experiment 2, ceramic capacitor samples were obtained in the same manner as Sample No. 3, except that "an area of first segregation phases/an area of a predetermined field of view" was changed by changing the addition amount of the additive.

For the obtained sintered bodies or ceramic capacitor samples, "an area of first segregation phases/an area of a predetermined field of view", an "average particle size of main phases", a "relative permittivity", a "breakage probability during polishing", and a "resistivity" were measured in a similar manner to the above-mentioned one. Table 2 shows the results.

Experiment 3

Experiment 3 relates to samples in Table 3.

In Experiment 3, ceramic capacitor samples were obtained in the same manner as Sample No. 3, except that a molar ratio (Ba+Sr)/Si in the first segregation phases 18 was changed by changing the composition of the additive, namely, the starting raw material of the first segregation phases 18.

For the obtained sintered bodies or ceramic capacitor samples, "an area of first segregation phases/an area of a predetermined field of view", an "average particle size of main phases", a "relative permittivity", a "breakage probability during polishing", and a "resistivity" were measured in a similar manner to the above-mentioned one. Moreover, a "molar ratio (Ba+Sr)/Si in the first segregation phases" was measured by the following method. Table 3 shows the results.

(Molar Ratio (Ba+Sr)/Si in First Segregation Phases)

A molar ratio (Ba+Sr)/Si was calculated by measuring the Ba content, the Sr content, and the Si content with EDS in three first segregation phases in each of the three observation fields of view. Their average value is shown in Table 3 as "Molar Ratio (Ba+Sr)/Si in First Segregation Phases".

Experiment 4

Experiment 4 relates to samples in Table 4.

In Experiment 4, ceramic capacitor samples were obtained in the same manner as Sample No. 3, except that the "average particle size of the specific first segregation phases" and "the average particle size of the specific first segregation phases/the average particle size of the main phases" were changed by changing the conditions for wet pulverization of the calcined powder of the composite oxide and the additive.

For the obtained sintered bodies or ceramic capacitor samples, "an area of first segregation phases/an area of a predetermined field of view", an "average particle size of main phases", a "relative permittivity", "a breakage probability during polishing", and a "resistivity" were measured in a similar manner to the above-mentioned one. Moreover, an "average particle size of specific first segregation phases" and "an average particle size of specific first segregation phases/an average particle size of main phases" were measured by the following method. Table 4 shows the results.

(Average Particle Size of Specific First Segregation Phases)

An average area of the specific first segregation phases 181 was calculated by dividing a total area of the first segregation phases 18 in the above-mentioned three observation fields of view by a total number of grain boundary triple points 161 in the above-mentioned three observation fields of view. Next, a circle area equivalent diameter was calculated from the obtained average area of the specific first segregation phases 181 and determined as an "average particle size of the specific first segregation phases".

(Average Particle Size of Specific First Segregation Phases/ Average Particle Size of Main Phases)

From the "average particle size of the specific first segregation phases" and the "average particle size of the main phases" obtained by the above-mentioned method, "the average particle size of the specific first segregation phases/ the average particle size of the main phases" was calculated.

TABLE 1

| Sample No. | Main Phases | Additive | Area of First Segregation Phases/Area of Predetermined Field of View | Average Particle Size of Main Phases [μm] | Relative Permittivity | Breakage Probability During Polishing | Resistivity [Ω · m] |
|---|---|---|---|---|---|---|---|
| 1 | $Ba_{3.1}Zr_{1.1}Nb_4O_{15.3}$ | none | — | 3.8 | 248 | 2/10 | 3.1E+09 |
| 2 | $Ba_{3.1}Zr_{1.1}Nb_4O_{15.3}$ | $\overline{BaSiO_3}$ | 0.041 | 0.69 | $\overline{458}$ | $\overline{0/10}$ | $\overline{3.2E+10}$ |
| 3 | $Ba_{1.55}Sr_{1.55}Zr_{1.1}Nb_4O_{15.3}$ | $BaSiO_3$ | 0.034 | 0.77 | 482 | 0/10 | 3.9E+10 |
| 4 | $Ba_{1.55}Sr_{1.55}Zr_{1.1}Nb_4O_{15.3}$ | $Ba_{0.5}Sr_{0.5}SiO_3$ | 0.033 | 0.72 | 492 | 0/10 | 3.9E+10 |

TABLE 2

| Sample No. | Area of First Segregation Phases/Area of Predetermined Field of View | Average Particle Size of Main Phases [μm] | Relative Permittivity | Breakage Probability During Polishing | Resistivity [Ω · m] |
|---|---|---|---|---|---|
| 11 | 0.003 | 1.22 | 441 | 1/10 | 3.3E+10 |
| 12 | 0.006 | 0.6 | 458 | 0/10 | 2.5E+10 |
| 3 | 0.041 | 0.69 | 458 | 0/10 | 3.2E+10 |
| 13 | 0.13 | 0.69 | 453 | 0/10 | 1.3E+10 |
| 14 | 0.18 | 0.67 | 421 | 0/10 | 2.7E+10 |

TABLE 3

| Sample No. | Area of First Segregation Phases/Area of Predetermined Field of View | Molar Ratio (Ba + Sr)/ Si in First Segregation Phases | Average Particle Size of Main Phases [μm] | Relative Permittivity | Breakage Probability During Polishing | Resistivity [Ω · m] |
|---|---|---|---|---|---|---|
| 21 | 0.031 | 0.98 | 1.18 | 431 | 1/10 | 1.9E+10 |
| 22 | 0.046 | 1.07 | 0.68 | 466 | 0/10 | 3.9E+10 |
| 3 | 0.041 | 1.19 | 0.69 | 458 | 0/10 | 3.2E+10 |
| 23 | 0.047 | 2.41 | 0.69 | 471 | 0/10 | 2.9E+10 |
| 24 | 0.047 | 2.6 | 0.79 | 411 | 0/10 | 1.4E+10 |

TABLE 4

| Sample No. | Area of First Segregation Phases/Area of Predetermined Field of View | Average Particle Size of Specific First Segregation Phases [μm] | Average Particle Size of Specific First Segregation Phases/ Average Particle Size of Main Phases | Average Particle Size of Main Phases [μm] | Relative Permittivity | Breakage Probability During Polishing | Resistivity [Ω · m] |
|---|---|---|---|---|---|---|---|
| 3 | 0.041 | 0.22 | 0.319 | 0.69 | 458 | 0/10 | 3.2E+10 |
| 31 | 0.039 | 0.5 | 0.820 | 0.61 | 466 | 0/10 | 1.6E+10 |
| 32 | 0.030 | 0.71 | 1.076 | 0.66 | 442 | 0/10 | 3.9E+10 |

Table 1 shows that when first segregation phases containing Ba and Si were included (Sample Nos. 2 to 4), the relative permittivity was higher, the breakage probability during polishing was lower, and the resistivity was higher, than those when no first segregation phases were included (Sample No. 1). The D90 of the particle sizes of the main phases 14 in Sample Nos. 2 to 4 was 3 μm or less.

Table 2 shows that when a ratio of an area of the first segregation phases to an area of the predetermined field of view was 0.005 to 0.15 (Sample Nos. 3, 12, and 13), the relative permittivity was higher, and the breakage probability during polishing was lower, than those when a ratio of an area of the first segregation phases to an area of the predetermined field of view was 0.003 (Sample No. 11).

Table 2 shows that when a ratio of an area of the first segregation phases to an area of the predetermined field of view was 0.005 to 0.15 (Sample Nos. 3, 12, and 13), the relative permittivity was higher than that when a ratio of an area of the first segregation phases to an area of the predetermined field of view was 0.18 (Sample No. 14).

Table 3 shows that when a molar ratio of a total of Ba element and Sr element to Si element in the first segregation phases was 1.05 to 2.5 (Sample Nos. 3, 22, and 23), the relative permittivity was higher, and the breakage probability during polishing was lower, than those when a molar ratio of a total of Ba element and Sr element to Si element in the first segregation phases was 0.98 (Sample No. 21).

Table 3 shows that when a molar ratio of a total of Ba element and Sr element to Si element in the first segregation phases was 1.05 to 2.5 (Sample Nos. 3, 22, and 23), the relative permittivity was higher than that when a molar ratio of a total of Ba element and Sr element to Si element in the first segregation phases was 2.6 (Sample No. 24).

Table 4 shows that when a ratio of an average particle size of the specific first segregation phases 181 to an average particle size of the main phases 14 was 1 or less (Sample Nos. 3 and 31), the relative permittivity was higher than that when a ratio of an average particle size of the specific first segregation phases 181 to an average particle size of the main phases 14 was 1.076 (Sample No. 32).

Description of the Reference Numerical

1 . . . multilayer ceramic capacitor
  10 . . . element body
    2 . . . dielectric layer
      14 . . . main phase
      16 . . . grain boundary
      161 . . . grain boundary triple point
      18 . . . first segregation phase
      181 . . . specific first segregation phase
    3 . . . internal electrode layer
  4 . . . external electrode

What is claimed is:

1. A dielectric composition comprising: main phases having a tungsten bronze structure; and first segregation phases, wherein the first segregation phases include Ba, Si and Sr, and a molar ratio of a total of Ba element and Sr element to Si element in the first segregation phases is 1.05 to 2.5.

2. The dielectric composition according to claim 1, wherein the main phases have an average particle size of 1.5 μm or less.

3. The dielectric composition according to claim 1, wherein a ratio of an area of the first segregation phases to an area of a predetermined field of view is 0.005 to 0.15.

4. The dielectric composition according to claim 1, wherein
  the first segregation phases surrounded by three or more of the main phases are specific first segregation phases, and
  a ratio of an average particle size of the specific segregation phases to an average particle size of the main phases is 1 or less.

5. The dielectric composition according to claim 1, wherein a composition of the main phases is represented by a formula of $A_aB_bD_4O_{15+\alpha}$, in which
  A includes at least Ba,
  B includes at least Zr,
  D includes at least Nb,
  a is 3.05 or more, and
  b is 1.01 or more.

6. An electronic device comprising the dielectric composition according to claim 1.

* * * * *